(12) United States Patent
Kubo et al.

(10) Patent No.: US 6,754,256 B1
(45) Date of Patent: Jun. 22, 2004

(54) SEARCHER FOR CDMA RECEIVER APPARATUS

(75) Inventors: Tokuro Kubo, Kawasaki (JP);
Morihiko Minowa, Kawasaki (JP);
Kensuke Sawada, Kawasaki (JP);
Noriyuki Kawaguchi, Kawasaki (JP);
Koji Matsuyama, Kawasaki (JP);
Yoshihiko Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/387,675

(22) Filed: Aug. 31, 1999

(30) Foreign Application Priority Data

Sep. 2, 1998 (JP) .......................................... 10-248152

(51) Int. Cl.$^7$ .............................. H04B 1/69; H04B 7/216
(52) U.S. Cl. ........................ 375/150; 375/343; 370/335; 370/342
(58) Field of Search ................................ 375/147, 148, 375/149, 150; 370/320, 335, 342, 441

(56) References Cited

U.S. PATENT DOCUMENTS

| | | | | |
|---|---|---|---|---|
| 5,608,722 A | * | 3/1997 | Miller | ........................ 370/320 |
| 6,122,311 A | * | 9/2000 | Watanabe et al. | ............ 375/147 |
| 6,137,788 A | * | 10/2000 | Sawahashi et al. | ......... 370/342 |
| 6,154,487 A | * | 11/2000 | Murai et al. | ................. 375/150 |
| 6,249,542 B1 | * | 6/2001 | Kohli et al. | ................. 375/150 |
| 6,363,105 B1 | * | 3/2002 | Sourour et al. | ............. 375/150 |
| 6,421,371 B1 | * | 7/2002 | Sourour et al. | ............. 375/142 |
| 6,493,376 B1 | * | 12/2002 | Harms et al. | ................ 375/130 |

* cited by examiner

*Primary Examiner*—Jean B. Corrielus
*Assistant Examiner*—Qutub Ghulamali
(74) *Attorney, Agent, or Firm*—Katten Muchin Zavis Rosenman

(57) ABSTRACT

A searcher for a CDMA receiver apparatus includes a correlator obtaining a correlation value between a spreading code sequence and a spreading code sequence within a received signal, and a non-linear processor carrying out a non-linear conversion to convert one of the correlation value and a predetermined value indicative of the correlation value into correlation value information which has a data width smaller than that of the one of the correlation value and the predetermined value. The correlation value information is used to carry out a search process to search for a synchronizing timing with respect to the spreading code sequence within the received signal.

25 Claims, 16 Drawing Sheets

FIG.16

| AdB | BdB | ΔdB | A+BdB | δ |
|---|---|---|---|---|
| 20.0(50) | 6.4(16) | 13.6(34) | 20.0(50) | 0.0(0) |
| 20.0(50) | 6.8(17) | 13.2(33) | 20.0(50) | 0.0(0) |
| 20.0(50) | 7.2(18) | 12.8(32) | 20.4(51) | 0.4(1) |
| 20.0(50) | 7.6(19) | 12.4(31) | 20.4(51) | 0.4(1) |
| 20.0(50) | 8.0(20) | 12.0(30) | 20.4(51) | 0.4(1) |
| 20.0(50) | 8.4(21) | 11.6(29) | 20.4(51) | 0.4(1) |
| 20.0(50) | 8.8(22) | 11.2(28) | 20.4(51) | 0.4(1) |
| 20.0(50) | 9.2(23) | 10.8(27) | 20.4(51) | 0.4(1) |
| 20.0(50) | 9.6(24) | 10.4(26) | 20.4(51) | 0.4(1) |
| 20.0(50) | 10.0(25) | 10.0(25) | 20.4(51) | 0.4(1) |
| 20.0(50) | 10.4(26) | 9.6(24) | 20.4(51) | 0.4(1) |
| 20.0(50) | 10.8(27) | 9.2(23) | 20.4(51) | 0.4(1) |
| 20.0(50) | 11.2(28) | 8.8(22) | 20.4(51) | 0.4(1) |
| 20.0(50) | 11.6(29) | 8.4(21) | 20.4(51) | 0.4(1) |
| 20.0(50) | 12.0(30) | 8.0(20) | 20.8(52) | 0.8(2) |
| 20.0(50) | 12.4(31) | 7.6(19) | 20.8(52) | 0.8(2) |
| 20.0(50) | 12.8(32) | 7.2(18) | 20.8(52) | 0.8(2) |
| 20.0(50) | 13.2(33) | 6.8(17) | 20.8(52) | 0.8(2) |
| 20.0(50) | 13.6(34) | 6.4(16) | 20.8(52) | 0.8(2) |
| 20.0(50) | 14.0(35) | 6.0(15) | 20.8(52) | 0.8(2) |
| 20.0(50) | 14.4(36) | 5.6(14) | 20.8(52) | 0.8(2) |
| 20.0(50) | 14.8(37) | 5.2(13) | 20.8(52) | 0.8(2) |
| 20.0(50) | 15.2(38) | 4.8(12) | 21.2(53) | 1.2(3) |
| 20.0(50) | 15.6(39) | 4.4(11) | 21.2(53) | 1.2(3) |
| 20.0(50) | 16.0(40) | 4.0(10) | 21.6(54) | 1.6(4) |
| 20.0(50) | 16.4(41) | 3.6(9) | 21.6(54) | 1.6(4) |
| 20.0(50) | 16.8(42) | 3.2(8) | 21.6(54) | 1.6(4) |
| 20.0(50) | 17.2(43) | 2.8(7) | 22.0(55) | 2.0(5) |
| 20.0(50) | 17.6(44) | 2.4(6) | 22.0(55) | 2.0(5) |
| 20.0(50) | 18.0(45) | 2.0(5) | 22.0(55) | 2.0(5) |
| 20.0(50) | 18.4(46) | 1.6(4) | 22.4(56) | 2.4(6) |
| 20.0(50) | 18.8(47) | 1.2(3) | 22.4(56) | 2.4(6) |
| 20.0(50) | 19.2(48) | 0.8(2) | 22.8(57) | 2.8(7) |
| 20.0(50) | 19.6(49) | 0.4(1) | 22.8(57) | 2.8(7) |
| 20.0(50) | 20.0(50) | 0.0(0) | 23.2(58) | 3.2(8) |

SEARCHER FOR CDMA RECEIVER APPARATUS

BACKGROUND OF THE INVENTION

1. Field of the Invention

The present invention generally relates to searchers for Code Division Multiple Access (CDMA) receiver apparatuses, and more particularly to a searcher which searches for a synchronizing timing with respect to a spreading code sequence within a received signal in a CDMA receiver apparatus.

When a CDMA system such as a Direct Sequence Code Division Multiple Access (DS-CDMA) system is applied to a mobile communication, it is essential to provide in a receiver apparatus a searcher function for detecting a timing of a despreading code by carrying out a path detection. In order to realize this searcher function, there are demands to reduce the number of bits of correlation value information which is obtained from a correlator output, and to provide substantially the same dynamic range or an improved dynamic range as compared to the conventional dynamic range.

2. Description of the Related Art

FIG. 1 is a system block diagram for explaining the operating principle of the CDMA system which is employed in a mobile communication or the like. As shown in FIG. 1, a transmitting end uses a modulator 81 to modulate information data having a rate of 10 kbps, for example, into a spreading code sequence having a rate of 1 Mcps, for example, so as to carry out a spectrum spreading, and a radio transmission is made from a transmitter 82. At a receiving end, a spectrum spread radio wave is received by a receiver 85, and a spreading code sequence having the same pattern as that used at the transmitting end is generated by a spreading code generator 87. This spreading code sequence is multiplied to the received wave by a demodulator 86, so as to carry out a despreading and obtain the original information data. When carrying out this despreading, an input timing of the spreading code sequence within the received wave is detected by a searcher 88, in order to synchronize the spreading code sequence generated by the spreading code generator 87 and the spreading code sequence within the received wave. The searcher 88 instructs a generation timing of the spreading code generator 87 based on the detected input timing, so that the spreading code sequence generated by the spreading code generator 87 is synchronized to the spreading code sequence within the received wave.

FIG. 2 is a system block diagram showing an example of the construction of the searcher 88. For example, a 8-bit parallel input signal is input to a correlator 90. The correlator 90 includes a multi-stage shift register 91 successively input with the input signal, a memory 92 storing a part of the spreading code sequence, such as a pilot signal, multipliers 93, and an adder 94. Each multiplier 93 compares corresponding bits of the output sequence of the shift register 91 and the output sequence of the memory 92, and outputs a high-level signal when the corresponding bits of the compared output sequences match. More particularly, each multiplier 93 carries out an exclusive-OR operation on the corresponding bits of the two output sequences. The adder 94 adds outputs of each of the multipliers 93. According to the correlator 90, a maximum amplitude is output when the spreading code sequence within the received wave which is successively input matches the part of the spreading code sequence set in the memory 92. The input timing of the spreading code sequence within the received wave can be detected based on this maximum amplitude output.

For example, a 10-bit output value from the correlator 90 is squared in a multiplier 95 and is converted into a 20-bit power value, for example. This 20-bit power value is stored in a delay profile memory 97 via an adder 96, as a delay profile data. This delay profile data is generated by the adder 96 which carries out a cyclic integration of the power values which are successively input and a cumulative addition thereof.

According to the conventional searcher 88, the antilogarithms (true values) of the data are processed subsequent to the output of the correlator 90. For this reason, when a 10-bit correlation value is converted into a power value by obtaining the square of the correlation value, the data width of the power value is enlarged to 20 bits. As a result, the scale of the circuit which carries out the operation becomes large, and the operation speed becomes slow. In addition, a memory capacity required to store the delay profile data becomes large.

Consequently, the data width of the power value is reduced by deleting the lower 10 bits of the 20-bit power value, for example. But when only the upper 10 bits of the power value are processed, there is a problem in that a dynamic range of the data inevitably becomes small.

In addition, even in the case of the power value having the data width of 20 bits, the dynamic range of the data is only 60 dB, for example, and there are demands to further improve the dynamic range of the data.

On the other hand, the problems described above not only occurs when converting the correlator output value into the power value, but similar problems also occur when a search operation is carried out by using the correlator output value as it is. Hence, there are demands to carry out the search operation by utilizing a correlator output value which has a small data width but has a large dynamic range.

SUMMARY OF THE INVENTION

Accordingly, it is a general object of the present invention to provide a novel and useful searcher for a CDMA receiver apparatus, in which the problems described above are eliminated and the demands described above are satisfied.

Another and more specific object of the present invention is to provide a searcher for a CDMA receiver apparatus, wherein information related to a correlation value which is used or a search operation is subjected to a non-linear processing, so as to reduce the number of bits of the correlation value while enlarging a dynamic range of the correlation value, so that the dynamic range becomes equivalent to or larger than a dynamic range which would be obtained when processing antilogarithms of the data.

Still another object of the present invention is to provide a searcher for a CDMA receiver apparatus, comprising a correlator obtaining a correlation value between a spreading code sequence and a spreading code sequence within a received signal, and a non-linear processor carrying out a non-linear conversion to convert one of the correlation value and a predetermined value indicative of the correlation value into correlation value information which has a data width smaller than that of the one of the correlation value and the predetermined value, where the correlation value information is used to carry out a search process to search for a synchronizing timing with respect to the spreading code sequence within the received signal. According to the searcher of the present invention, it is possible to reduce the data width (number of bits) while enlarging the dynamic range to a range equivalent to or greater than the dynamic range which is obtained when the data is treated in the form of the antilogarithm. Furthermore, it is possible to reduce the scale of the circuit and improve the operation speed of the searcher by carrying out the search operation using such data having the reduced data width.

A further object of the present invention is to provide a searcher for a CDMA receiver apparatus, comprising a correlator obtaining a correlation value between a spreading code sequence and a spreading code sequence within a received signal, a non-linear processor carrying out a non-linear conversion to convert the correlation value into a value which has a data width smaller than that of the correlation value, and a power value converter converting the value obtained from the non-linear processor into a power value and outputting the power value as correlation value information, where the correlation value information is used to carry out a search process to search for a synchronizing timing with respect to the spreading code sequence within the received signal. According to the searcher of the present invention, it is possible to reduce the data width (number of bits) while enlarging the dynamic range to a range equivalent to or greater than the dynamic range which is obtained when the data is treated in the form of the antilogarithm. Furthermore, it is possible to reduce the scale of the circuit and improve the operation speed of the searcher by carrying out the search operation using such data having the reduced data width.

Another object of the present invention is to provide a searcher having either one of the constructions described above, where non-linear conversion includes a logarithmic conversion of an input value into a value having a data width smaller than that of the input value. In other words, a process using logarithmic or n-th root ($X^{1/n}$) is carried out, where the base of the logarithm is not limited to a specific value. Of course, the dynamic range can be varied depending on the base which is used. Typically, the base is 10, e (2.7182), or the like, and the dynamic range becomes wider as the value of the base becomes larger.

Still another object of the present invention is to provide a CDMA receiver apparatus comprising a generator generating a spreading code, and a searcher controlling a generation timing of the generator, where the searcher comprises a correlator obtaining a correlation value between a spreading code sequence and a spreading code sequence within a received signal, and a non-linear processor carrying out a non-linear conversion to convert one of the correlation value and a predetermined value indicative of the correlation value into correlation value information which has a data width smaller than that of the one of the correlation value and the predetermined value, and the correlation value information is used to carry out a search process to search for a synchronizing timing with respect to the spreading code sequence within the received signal. According to the CDMA receiver apparatus of the present invention, it is possible to reduce in the searcher the data width (number of bits) while enlarging the dynamic range to a range equivalent to or greater than the dynamic range which is obtained when the data is treated in the form of the antilogarithm. Furthermore, it is possible to reduce the scale of the circuit and improve the operation speed of the searcher by carrying out the search operation using such data having the reduced data width.

Other objects and further features of the present invention will be apparent from the following detailed description when read in conjunction with the accompanying drawings.

BRIEF DESCRIPTION OF THE DRAWINGS

FIG. 1 is a system block diagram for explaining the operating principle of a CDMA system which is employed in a mobile communication or the like;

FIG. 16 is a diagram showing a table for explaining the logarithmic addition process of the eleventh embodiment of the searcher;

DESCRIPTION OF THE PREFERRED EMBODIMENTS

First Embodiment

Figure 1:
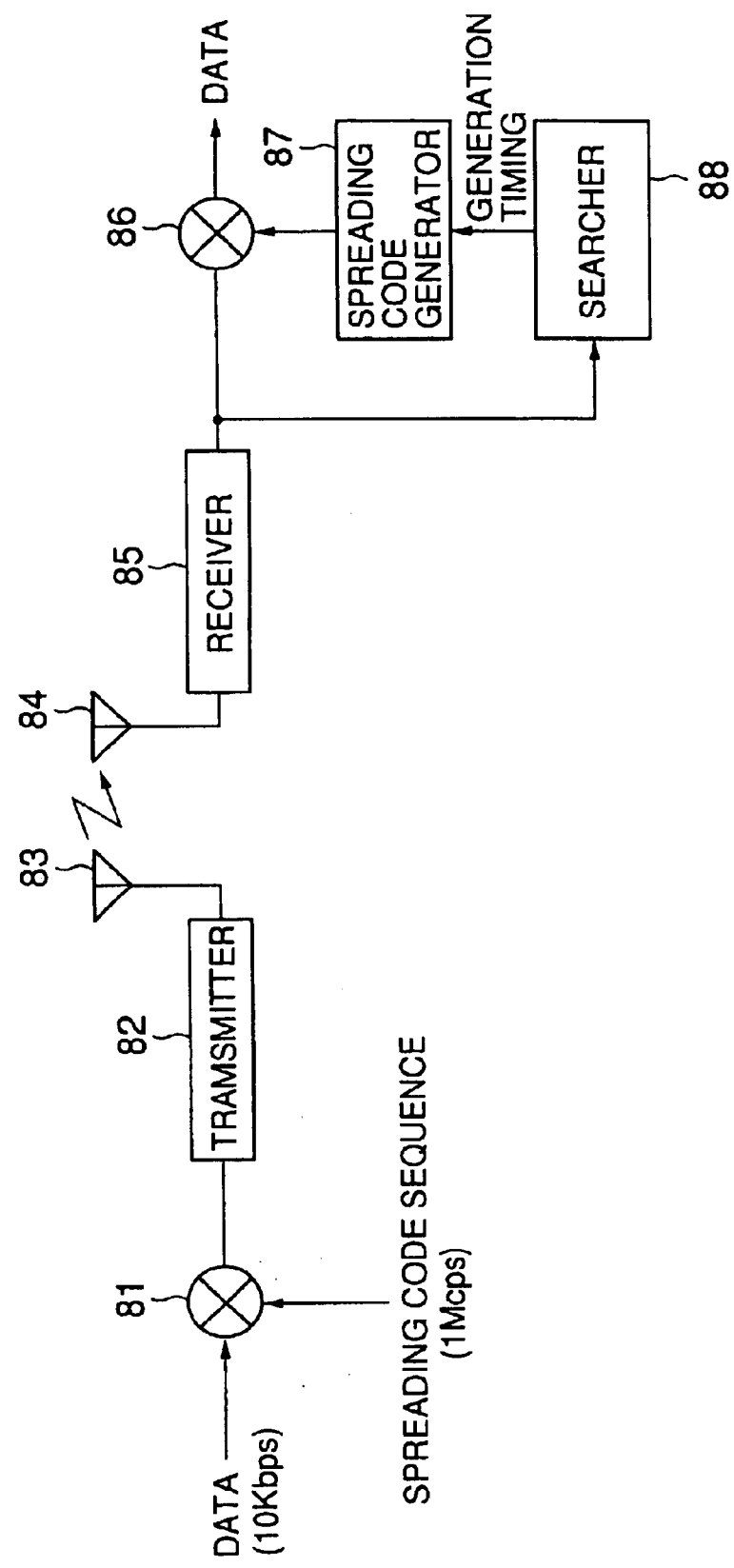
Figure 2:
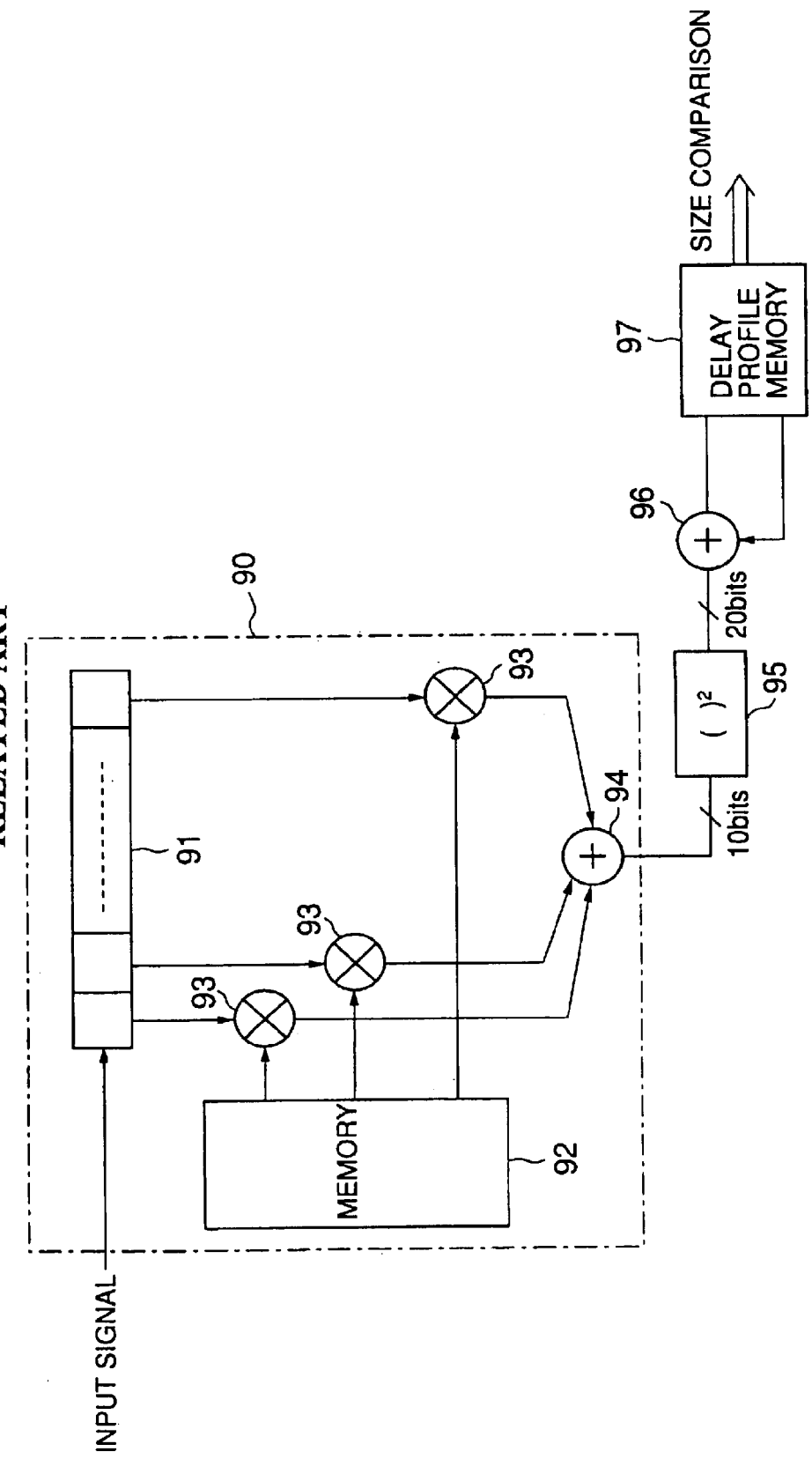
FIG. 2 is a system block diagram showing an example of the construction of a searcher.
Figure 3:
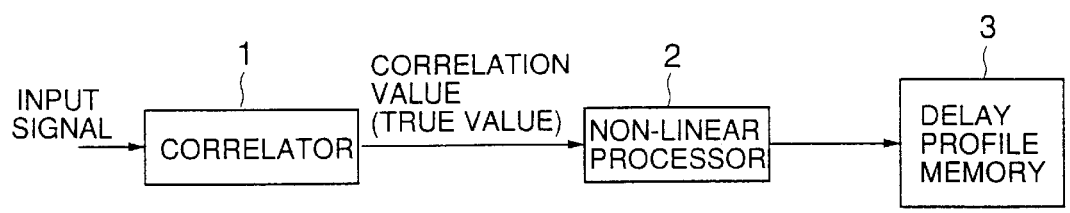
FIG. 3 is a system block diagram showing a first embodiment of a searcher according to the present invention.

FIG. 3 shows the construction of a first embodiment of a searcher according to the present invention. In FIG. 3, a received signal which is received by a receiver (not shown) is successively input to a correlator 1 as an input signal. As described above, the correlator 1 obtains a correlation between the spreading code sequence within the input signal and a part of the spreading code sequence preset in the correlator 1, and outputs a correlation value indicative of the obtained correlation.

Normally, a correlation value output from a correlator is an antilogarithm (true value). In this specification, the "antilogarithm" refers to a value which changes in units of the same numerical value width within a range from a maximum value to a minimum value of the values the antilogarithm may take. In order to make the correlation value, that is, the antilogarithm, output from the correlator have a large dynamic range, it is necessary to represent the correlation value by an extremely large number of bits. For this reason, the number of bits of a delay profile memory becomes large, thereby increasing the scale of the circuit.

Hence, in this embodiment, the correlation value output from the correlator 1 is supplied to a non-linear processor 2 shown in FIG. 3, in order to reduce the number of bits of the data. More particularly, the non-linear processor 2 converts the correlation value into a non-linear value which is made up of a number of bits smaller than that of the correlation value. The "non-linear value" is a logarithmic value, for example, and refers to a value which changes in units of different numerical value widths (step widths) depending on a position within a range from a maximum value to a minimum value of the values the non-linear value may take. In the case of a logarithmic value, the numerical value width with which the value changes is set to a small value of 0.4 dB, for example, when the value is small, and the numerical value width is set to a larger value when the value is large.

The non-linear value from the non-linear processor 2 is stored in a delay profile memory 3 as a delay profile data.

Second Embodiment

The basic construction of a second embodiment of the searcher according to the present invention is substantially the same as that of the first embodiment shown in FIG. 3, and an illustration thereof will be omitted. In this embodiment, the non-linear processor 2 is made up of a logarithmic converter which carries out logarithmic and n-th root ($X^{1/n}$) processes with respect to the correlation value output from the correlator 1. Otherwise, the second embodiment is the same as the first embodiment.

When carrying out the logarithmic process in the logarithmic converter of this second embodiment, the base of the logarithm is not limited to a specific value. However, the larger the base of the logarithm, the larger the dynamic range. On the other hand, if the logarithmic conversion is carried out with a base of the logarithm which is excessively large, it may become impossible to distinguish the size difference between two antilogarithms when the antilogarithms are large, depending on the resolving power.

Third Embodiment

Figure 4:
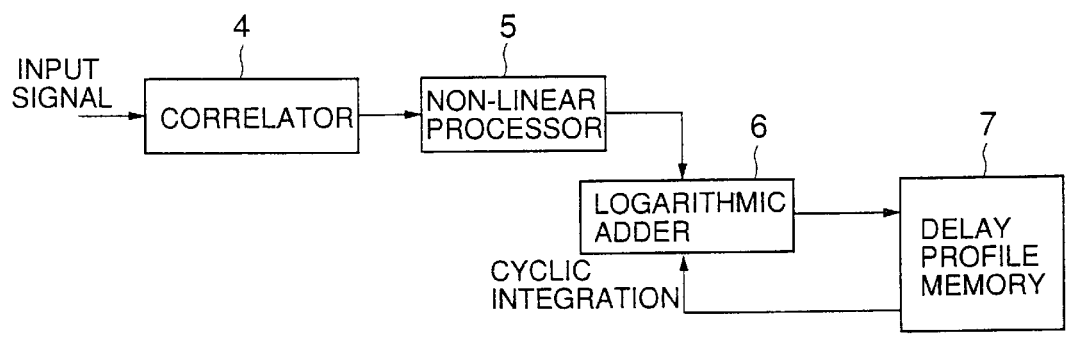
FIG. 4 is a system block diagram showing a third embodiment of the searcher according to the present invention.

FIG. 4 shows a third embodiment of the searcher according to the present invention. In this embodiment, a non-linear processor 5 is made up of a logarithmic converter which carries out logarithmic and n-th root processes with respect to the correlation value output from a correlator 4. In addition, a logarithmic adder 6 is provided between the non-linear processor 5 and a delay profile memory 7, so as to carry out a cyclic integration with respect to the correlation value (logarithmic value) after the logarithmic conversion when generating the delay profile data.

The correlator 4 is made up of a matching filter (MF) having a number of taps corresponding to 1 symbol length. This correlator 4 outputs the correlation value as an antilogarithm. The correlation value, that is, the antilogarithm, is converted into the logarithmic value by the non-linear processor 5. The logarithmic adder 6 carries out a logarithmic addition of the logarithmic value output from the non-linear processor 5 and the logarithmic value of the data stored in the delay profile memory 7, and the cyclic integration is carried out a predetermined number of times, so as to generate the delay profile data which is then stored in the delay profile memory 7.

According to this embodiment, even in a case where it is necessary to provide a dynamic range equivalent to the case where the correlation value is processed in the form of the antilogarithm, it is possible to reduce the number of bits of the correlation value which is output from the correlator 4 and subjected to the logarithmic conversion before being stored in the delay profile memory 7 as the correlation value data, that is, the number of bits of the logarithmic value which is stored as the delay profile data. For this reason, it is possible reduce the scale of the circuit.

Fourth Embodiment

Figure 5:
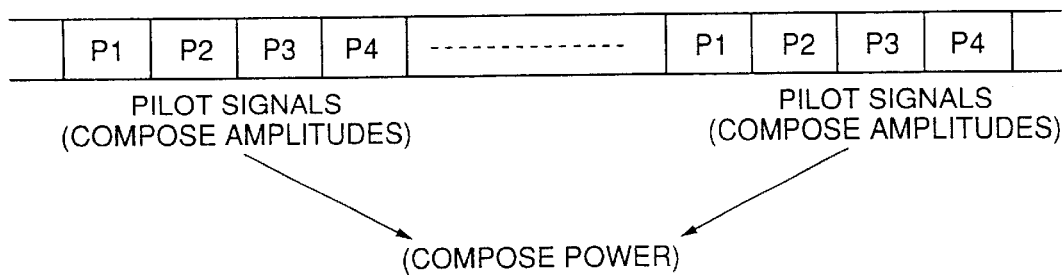
FIG. 5 is a diagram showing a signal format employed by a system which composes power using a pilot signal.
Figure 6:
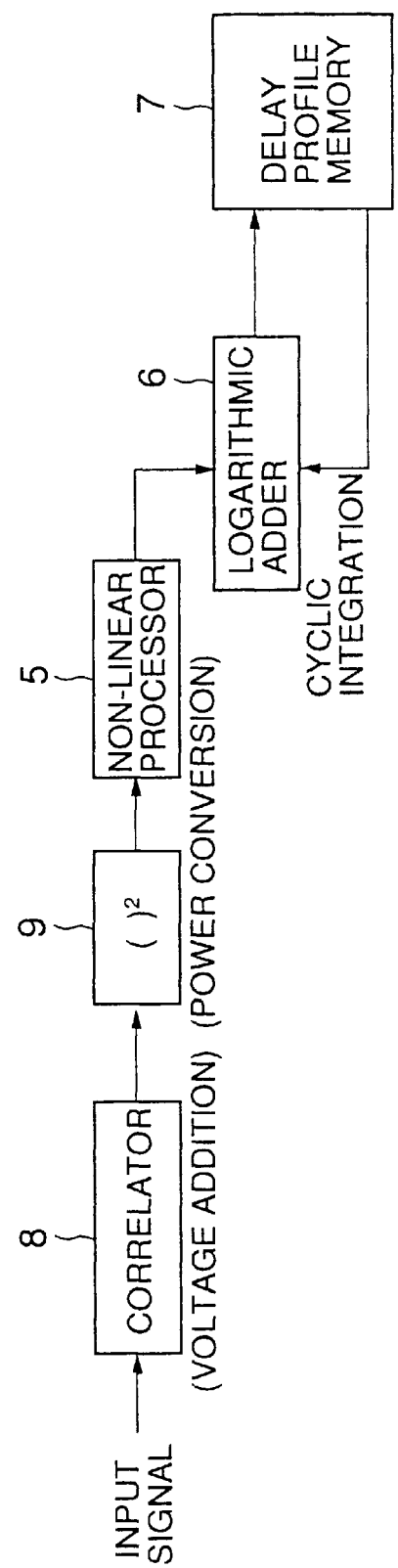
FIG. 6 is a system block diagram showing a fourth embodiment of the searcher according to the present invention.

FIG. 5 shows a signal format of the input signal which is input to a fourth embodiment of the searcher according to the present invention, and FIG. 6 shows the fourth embodiment of the searcher. In FIG. 6, those parts which are the same as those corresponding parts in FIG. 4 are designated by the same reference numerals, and a description thereof will be omitted.

As shown in FIG. 5, the input signal input to a correlator 8 has a signal format in which 4 pilot signals P1 through P4 are inserted as known data between information data at constant intervals. The 4 pilot signals P1 through P4 form 1 pilot block, and such pilot blocks are arranged at constant intervals between the information data. For example, time intervals of the pilot signals P1 through P4 are 125 $\mu$s, and time intervals of the pilot blocks are 625 $\mu$s. According to this signal format, the time intervals of the pilot signals P1 through P4 within 1 pilot block are relatively small, and the effects of phase rotation or the like are small, thereby making it possible to obtain 1 correlation value data by adding voltages (composing voltages) of the pilot signals P1 through P4 within 1 pilot block. On the other hand, the time intervals of the pilot blocks are relatively large, and the effects of phase rotation or the like may not necessarily be small, thereby making it inappropriate to add voltages of the pilot blocks when obtaining the correlation value data. Thus, it is more appropriate to carry out a squaring operation on the voltages of the pilot blocks to convert the voltages into power values and to add the power values when obtaining the correlation value data.

In other words, the searcher detects the correlation values from the consecutive pilot signals P1 through P4, with respect to the input signal having the signal format described above, and carries out a voltage addition of the correlation values of the pilot signals P1 through P4 to output a correlation value which is an antilogarithm. In addition, between 2 pilot blocks having the information data inserted therebetween, the searcher carries out a squaring operation with respect to the correlation value (antilogarithm) which is output with respect to each pilot block, so as to convert the correlation value of the pilot block into a power value. Furthermore, the squared values of the correlation values of the 2 pilot blocks are added, so as to add the power values. Hence, it is possible to greatly improve the signal-to-noise (S/N) ratio by adding the voltages of the correlation values of the consecutive pilot signals, that is, by composing the amplitudes of the correlation values. For this reason, it is possible to reduce the number of cyclic integrations, and to carry out a search operation in a state where the reception level is low.

In this fourth embodiment, the input signal has 4 symbols in the signal format shown in FIG. 5, that is, the 4 consecutive pilot signals P1 through P4. Accordingly, the correlator 8 shown in FIG. 6 is made up of a matching filter which outputs the correlation value by adding the voltages of the 4 symbols, that is, composing the amplitudes of the 4 symbols.

Thereafter, with respect to the correlation value output from the correlator 8, a multiplier 9 carries out a squaring operation to convert the correlation value into the power value, so as to enable addition of the power values of non-consecutive pilot blocks. The number of bits of the power value increases due to the squaring operation described above, but this embodiment carries out a common logarithmic conversion process with respect to the power value in the non-linear processor 5. As a result, the number of bits of the power value is reduced by this common logarithmic conversion process.

For example, in a case where the correlation value output from the correlator 8 has a data width of 16 bits, the multiplier 9 outputs the power value which has a data width of 32 bits due to the squaring operation. If the power value output from the multiplier 9 and having the data width of 32 bits were processed as it is, the scale of the subsequent circuit part increases and the processing speed of the subsequent circuit part decreases due to the increased number of bits. However, when the common logarithmic conversion process is carried out as in this embodiment, it is possible to realize a dynamic range which is obtained by use of 32 bits with a resolving power of 0.375 dB, using only 8 bits.

The power value which is subjected to the common logarithmic conversion process is then subjected to a cyclic integration using the logarithmic adder 6 and the delay profile memory 7, similarly to the third embodiment described above. The delay profile data which is obtained as a result is stored in the delay profile memory 7.

Fifth Embodiment

Figure 7:
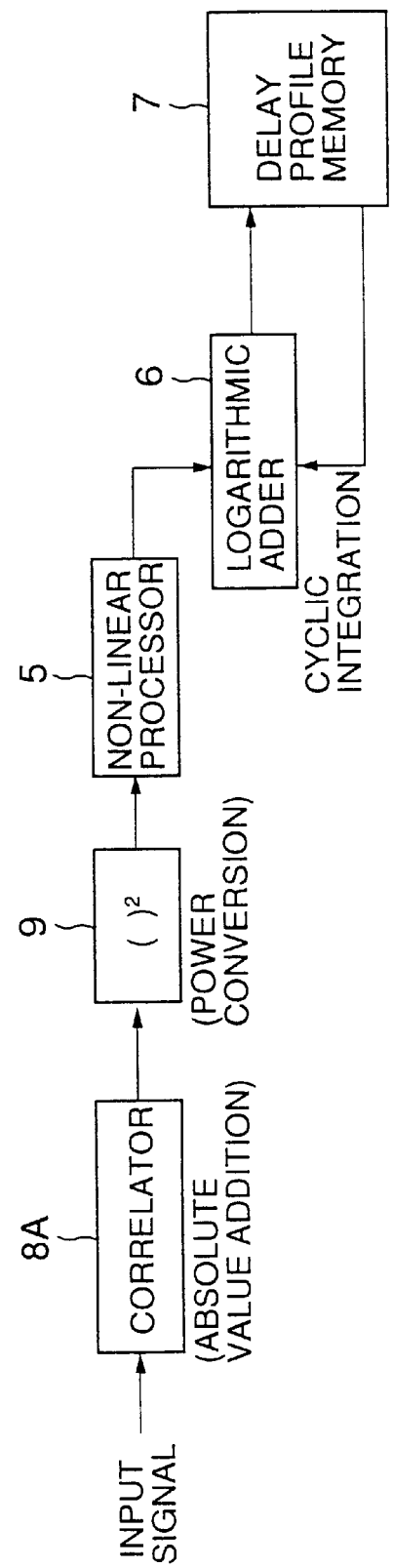
FIG. 7 is a system block diagram showing a fifth embodiment of the searcher according to the present inventions

FIG. 7 shows a fifth embodiment of the searcher according to the present invention. In FIG. 7, those parts which are the same as those corresponding parts in FIG. 6 are designated by the same reference numerals, and a description thereof will be omitted.

In the fourth embodiment described above, the correlator 8 carries out the voltage addition by detecting the correlation value from the consecutive pilot signals P1 through P4 in 1 pilot block. In addition, the multiplier 9 carries out the squaring operation between 2 pilot blocks having the information data arranged therebetween, and adds the power values obtained by the squaring operation.

On the other hand, in this fifth embodiment, a correlator 8A carries out a voltage addition by detecting the correlation values from the consecutive pilot signals P1 through P4 in 1 pilot block, obtaining absolute values of the correlation values of the pilot signals P1 through P4, and adding the absolute values. Furthermore, the multiplier 9 carries out the squaring operation between 2 pilot blocks having the information data arranged therebetween, and adds the power values obtained by the squaring operation.

According to this fifth embodiment, the correlation value which is output from the correlator 8A by the addition of the absolute values of the correlation values of the pilot signals P1 through P4 is converted into the power value in the multiplier 9, before being supplied to the logarithmic converter forming the non-linear processor 5. Hence, the number of bits of the data is reduced by the logarithmic conversion, similarly as in the fourth embodiment described above.

Sixth Embodiment

Figure 8:
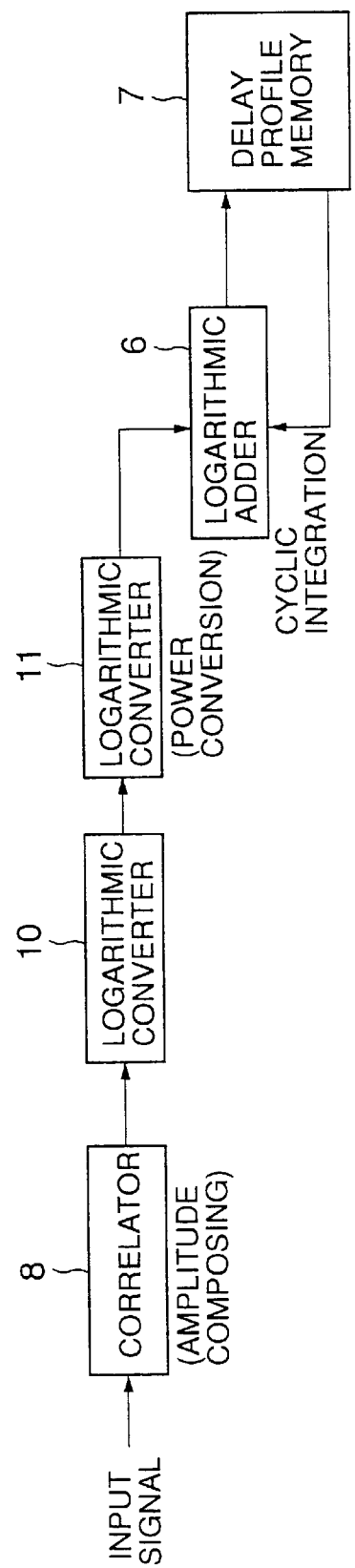
FIG. 8 is a system block diagram showing a sixth embodiment of the searcher according to the present invention.

FIG. 8 shows a sixth embodiment of the searcher according to the present invention. In FIG. 8, those parts which are the same as those corresponding parts in FIG. 6 are designated by the same reference numerals, and a description thereof will be omitted.

In the fourth embodiment described above, the correlation value is subjected to the squaring operation before carrying out the logarithmic conversion.

But in this sixth embodiment, the correlation value output from the correlator 8 is first supplied to a logarithmic converter 10, and an output of the logarithmic converter 10 is then supplied to another logarithmic converter 11. The logarithmic converter 10 converts the correlation value into a logarithmic correlation value. On the other hand, the logarithmic converter 11 converts the logarithmic correlation value into a power value by carrying out a bit-shift operation.

When the correlation value which is obtained by the voltage addition (amplitude composing) in the correlator 8 is converted into the logarithmic correlation value, the squaring operation of the antilogarithm can be realized by simply carrying out a doubling operation with respect to the logarithmic correlation value. This doubling operation can be realized by a bit-shift operation, that is, the power value can be obtained by the bit-shift operation. Therefore, according to this sixth embodiment, the squaring operation of the antilogarithm which normally increases the scale of the circuit and reduces the operation speed of the circuit, can be realized by a simple circuit which carries out the bit-shift operation, and the scale of the circuit can greatly be reduced.

Seventh Embodiment

Figure 9:
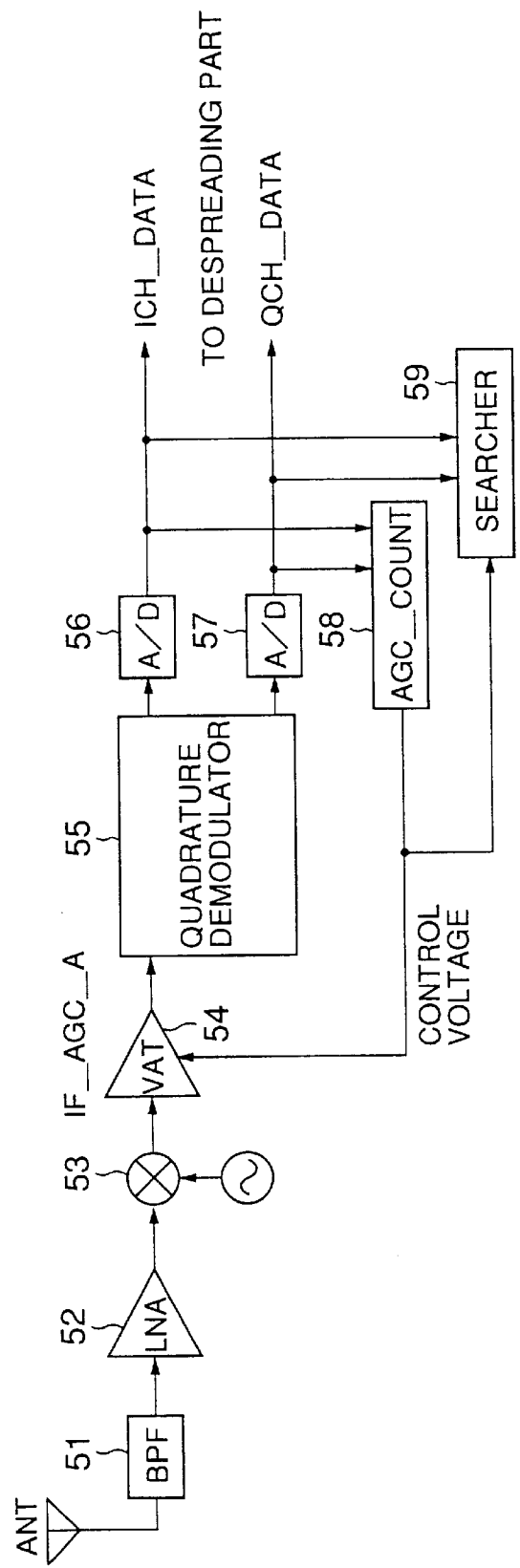
FIG. 9 is a system block diagram showing a receiver apparatus which is provided with an IF-AGC function and may be applied with a seventh embodiment of the searcher according to the present invention.
Figure 10:
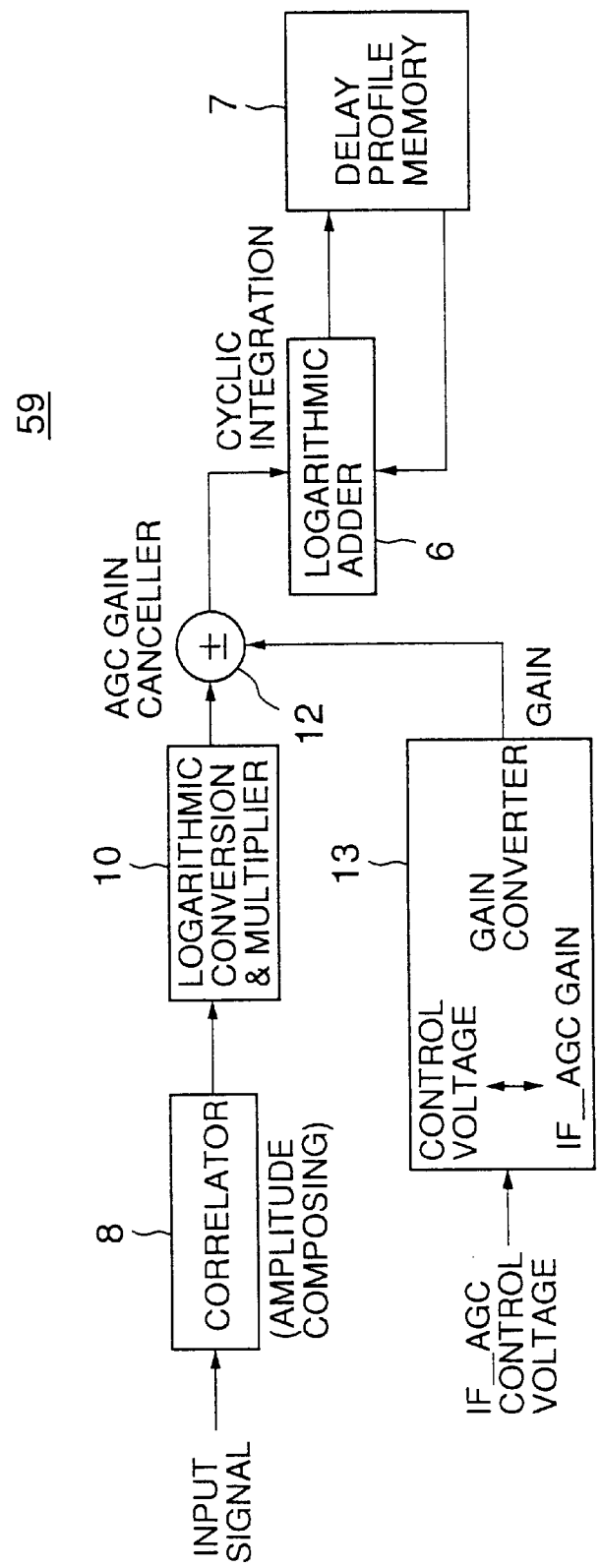
FIG. 10 is a system block diagram showing the seventh embodiment of the searcher.

FIG. 9 shows a CDMA linear receiver apparatus which is provided with an IF-AGC function and may be applied with a seventh embodiment of the searcher according to the present invention. FIG. 10 shows a seventh embodiment of the searcher according to the present invention. In FIG. 10, those parts which are the same as those corresponding parts in FIG. 8 are designated by the same reference numerals, and a description thereof will be omitted.

The receiver apparatus shown in FIG. 9 includes a bandpass filter 51 for eliminating a noise frequency of a received radio wave, a linear amplifier 52 for linearly amplifying the received radio wave, a frequency converter 53 for frequency-converting the received radio wave into an intermediate frequency band, a variable attenuator 54 for carrying out an automatic gain control (AGC) in the intermediate frequency band, a quadrature demodulator 55 for demodulating the received radio wave into I and Q channels, an analog-to-digital (A/D) converter 56 for converting the I-channel data, an A/D converter 57 for converting the Q-channel data, an AGC controller 58 for controlling a gain (attenuation rate) of the variable attenuator 54 based on amplitude values of the I-channel data and the Q-channel data output from the A/D converters 56 and 57, and a searcher 59. The I-channel data and the Q-channel data output from the A/D converters 56 and 57 are also supplied to a despreading part (not shown). The searcher 59 detects a timing for synchronizing the spreading code sequence of the received radio wave based on the I-channel data and the Q-channel data which are received from the A/D converters 56 and 57.

In the linear receiver apparatus shown in FIG. 9, the AGC function is provided for the purposes of maintaining the inputs to the A/D converters 56 and 57 constant, in order to fully utilize the dynamic ranges of the A/D converters 56 and 57. More particularly, this particular linear receiver apparatus has an IF-AGC function in the intermediate frequency (IF) band. In other words, according to this IF-AGC function, the levels of the output values of the A/D converters 56 and 57 are detected by the AGC controller 58, and the AGC controller 58 controls the gain of the variable attenuator 54 so that the levels become approximately constant regardless of the magnitude of the reception level of the received radio wave.

On the other hand, the levels of the input signals which are input to the searcher 59 are made constant by varying the gain of the AGC function. As a result, the correlation values output from the searcher 59 in the receiver apparatus having the AGC function may not necessarily have substantially the same magnitude even when the correlation values have the same value, if the gains of the variable attenuator 54 at the time of detecting the correlation values are different.

In the embodiments described heretofore, the cyclic integration is carried out in order to improve the S/N ratio. However, the integrating operation may be carried out with respect to the correlation values which are obtained when the gains of the AGC are different, and it is thus necessary to cancel the difference of the AGC gains when carrying out the integrating operation. In other words, the correlation value is divided by the gain which is multiplied to the received radio wave by the variable attenuator 54, so as to eliminate the effects of the AGC from the correlation value. In order to carry out this gain cancelling operation, multiplication and division are normally required when processing the antilogarithm of the correlation value. On the other hand, the multiplication and division which are carried out for this gain cancelling operation can be substituted by addition and subtraction by converting the correlation value into a logarithmic value.

In the seventh embodiment shown in FIG. 10, the searcher 59 is provided with a mechanism for cancelling the gain of the AGC. The input signal, including the I-channel data and the Q-channel data, is input to the correlator 8 which is made up of the matching filter. The correlation value output from the correlator 8 is input to a logarithmic conversion and multiplier 10 which carries out a logarithmic converter with respect to the correlation value and a squaring operation with respect to a logarithmic value which is obtained by the logarithmic conversion. An output of the logarithmic converter and multiplier 10 is input to an AGC gain canceller 12 which adds or subtracts an AGC gain (logarithmic value) obtained from a control voltage and gain converter 13 with respect to the square value of the correlation value (logarithmic value), so as to realize the multiplication and division of the antilogarithm described above and to cancel the effects of the AGC gain on the correlation value. The control voltage and gain converter 13 receives an IF-AGC control voltage from the AGC controller 58 shown in FIG. 9, and converts this IF-AGC control voltage into the AGC gain. An output of the AGC gain canceller 12 is input to the logarithmic adder 6. This logarithmic adder 6 carries out a logarithmic addition of the logarithmic value output from the AGC gain canceller 12 and the logarithmic value of the data stored in the delay profile memory 7, and the cyclic integration is carried out a predetermined number of times, so as to generate the delay profile data which is then stored in the delay profile memory 7.

Therefore, according to this seventh embodiment, it is possible to prevent undesirable effects on the operation of the searcher 59 caused by the AGC function of the receiver apparatus, by eliminating the effects of the AGC gain on the correlation value before carrying out the cyclic integration of the correlation value. Furthermore, since the correlation value is converted into the logarithmic value before carrying out the AGC gain cancelling operation, the AGC gain cancelling operation can be realized by simple addition and subtraction, thereby making it possible to reduce both the scale and power consumption of the circuit.

Eighth Embodiment

Figure 11:
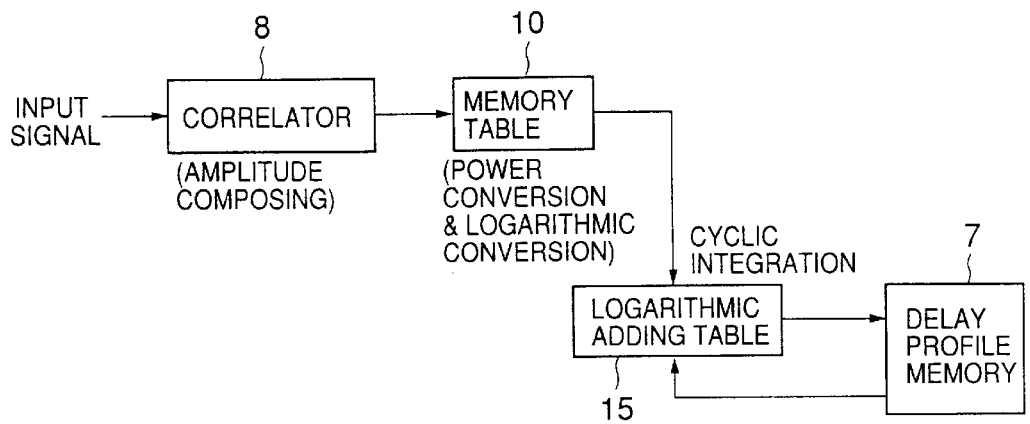
FIG. 11 is a system block diagram showing an eighth embodiment of the searcher according to the present invention.

FIG. 11 shows an eighth embodiment of the searcher according to the present invention. In FIG. 11, those parts which are the same as those corresponding parts in FIG. 6 are designated by the same reference numerals, and a description thereof will be omitted.

In the embodiments described heretofore, circuits are required to carry out the logarithmic conversion and the logarithmic addition. However, the logarithmic conversion and the logarithmic addition are difficult to realize by the normal addition, subtraction, multiplication and division.

Accordingly, in this eighth embodiment, the logarithmic conversion and the logarithmic addition are carried out by use of a memory table.

In FIG. 11, the correlation value output from the correlator 8 is input to a memory table 14. This memory table 14 is made up of a memory which stores logarithmic values and squared values of the logarithmic values, with respect to values the correlation value output from the correlator 8 takes. In other words, the correlation value (antilogarithm) output from the matching filter which forms the correlator 8 is used as an address input to look up a corresponding squared logarithmic value stored in the memory table 14. The squared logarithmic value, that is, the converted value or the logarithmic correction value, read from the memory table 14 is input to a logarithmic adding table 15.

The logarithmic adding table 15 is made up of a memory which stores added logarithmic values in correspondence with combinations of the correlation value (logarithmic value) received from the memory table 14 and the output (logarithmic value) received from the delay profile memory 7. In other words, the combination of the correlation value (logarithmic value) received from the memory table 14 and the output (logarithmic value) received from the delay profile memory 7 is used as an address input to look up the corresponding added logarithmic value stored in the logarithmic adding table 15.

Ninth Embodiment

Figure 12:
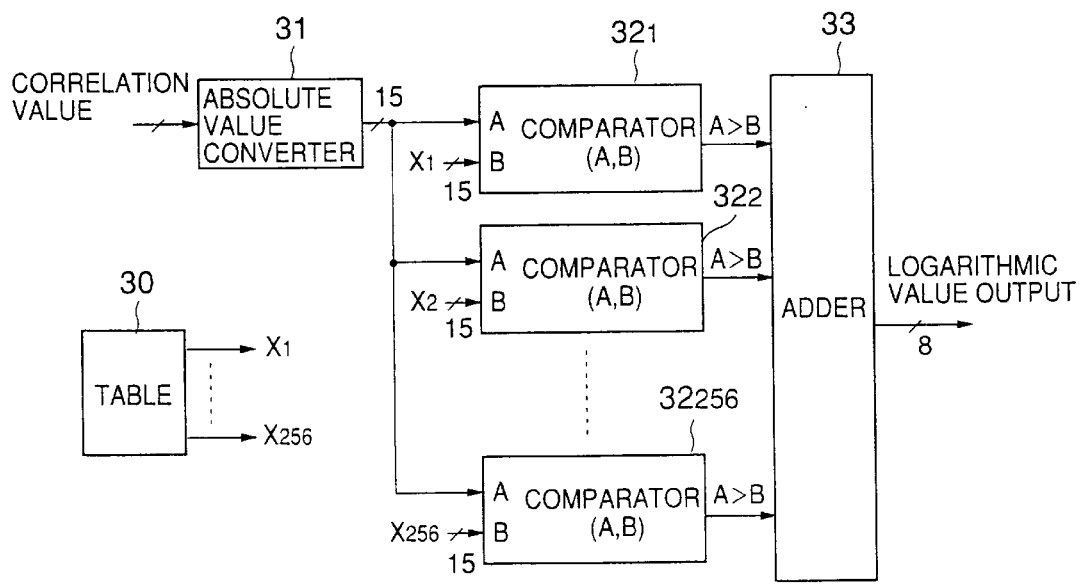
FIG. 12 is a system block diagram showing a ninth embodiment of the searcher according to the present invention.

FIG. 12 shows a ninth embodiment of the searcher according to the present invention. More particularly, FIG. 12 shows one construction of a converting part of the searcher for carrying out the logarithmic conversion and the squaring operation.

The eighth embodiment described above which carries out the logarithmic conversion by use of the memory table 14 can realize the searcher using a relatively simple construction. However, it is desirable to further improve the scale and operation speed of the circuit.

In this ninth embodiment, the logarithmic conversion is carried out by a logic circuit as shown in FIG. 12. In this particular case shown in FIG. 12, a 16-bit correlation value (amplitude value of the antilogarithm) obtained from the correlator 8 is converted into a 8-bit power value (logarithmic value), using a constant table 30, an absolute value converter 31, comparators $32_1$ through $32_{256}$, and an adder 33.

The absolute value converter 31 obtains an absolute value of the correlation value (antilogarithm) which is output from the matching filter which forms the correlator 8, and inputs this absolute value to input terminals A of the comparators $32_1$ through $32_{256}$. Constants $X_1$ through $X_{256}$ read from the constant table 30 are respectively input to input terminals B of the comparators $32_1$ through $32_{256}$. Each of the comparators $32_1$ through $32_{256}$ compares the values input to the input terminals A and B thereof, and outputs a signal having a value "1" if the value input to the input terminal A is greater than the value input to the input terminal B. Output signals of the comparators $32_1$ through $32_{256}$ are input to the adder 33, and this adder 33 outputs a squared correlation value as a logarithmic value.

Each of the constants $X_1$ through $X_{256}$ corresponds to a threshold value of the antilogarithm corresponding to one step, that is, an upper limit value of the step, when converting the squared value of the 16-bit correlation value (antilogarithm) output from the correlator 8 into the logarithmic value having 256 steps corresponding to the data width of 8 bits after the logarithmic conversion. A step width (antilogarithm) of the step is small when the correlation value output from the correlator 8 is small, and increases according to a logarithmic function as the correlation value becomes larger. More particularly, this ninth embodiment has a dynamic range of 102 dB by using 0.4 dB/step.

Tenth Embodiment

Figure 13:
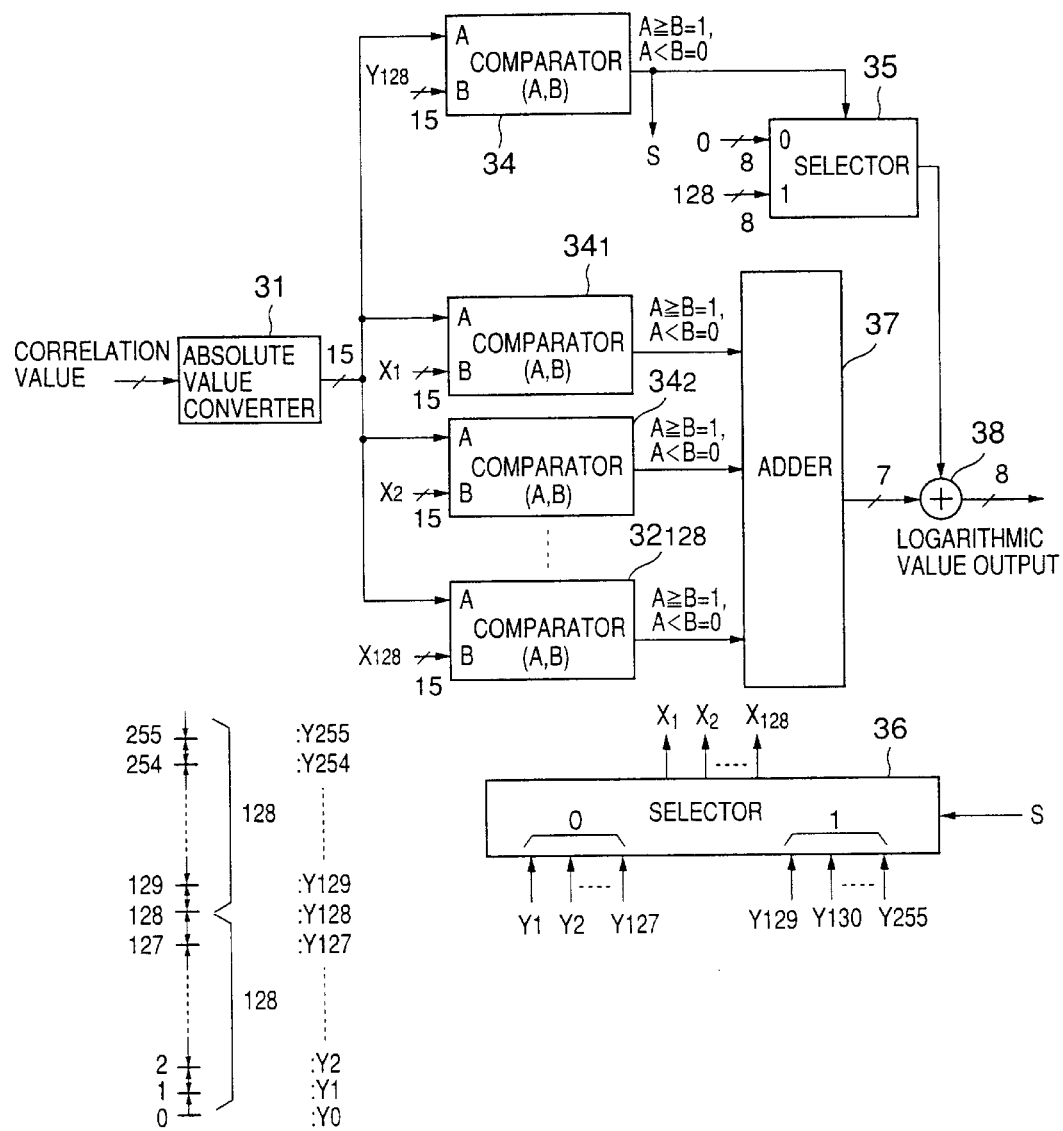
FIG. 13 is a system block diagram showing a tenth embodiment of the searcher according to the present invention.

FIG. 13 shows a tenth embodiment of the searcher according to the present invention. More particularly, FIG. 13 shows another construction of the converting part of the searcher for carrying out the logarithmic conversion and the squaring operation. In FIG. 13, those parts which are the same as those corresponding parts in FIG. 12 are designated by the same reference numerals, and a description thereof will be omitted.

According to the ninth embodiment described above, it is necessary to provide a number of comparators corresponding to the number of bits of the logarithmic value data in order to improve the accuracy of the logarithmic conversion.

On the other hand, this tenth embodiment reduces the number of comparators to (128+1) which is approximately ½ that of the ninth embodiment. A comparator 34 provided at an uppermost stage judges whether or not the correlation value (antilogarithm) input from the correlator 8 is the upper or lower half of the logarithmic value relative to one-half ($Y_{128}$) the absolute value. A selector 36 selects the constants $X_1$ through $X_{128}$ which are respectively input to the input terminals B of the comparators $32_1$ through $32_{128}$ depending on an output signal S of the comparator 34 indicative of the judgement result. In addition, a selector 35 selects the logarithmic value 128 and adds this value to an output value (logarithmic value) of an adder 37 by an adder 38 when the upper half of the logarithmic value is judged by the comparator 34, while the selector 35 selects the logarithmic value 0 when the lower half of the logarithmic value is judged by the comparator 34. As a result, it is possible to output the logarithmic value in a range of 0 to 255.

The correlation value (antilogarithm) output from the correlator 8 is divided into 256 steps $Y_0$ through $Y_{255}$ at an interval of the logarithmic width, which is 0.4 dB/step, for example. The constants are switched by using $Y_0$ through $Y_{127}$ as the constants $X_1$ through $X_{128}$ when the input correlation value (antilogarithm) is the lower half of the logarithmic value, and using $Y_{128}$ through $Y_{255}$ as the constants $X_1$ through $X_{128}$ when the input correlation value (antilogarithm) is the upper half of the logarithmic value.

Therefore, this tenth embodiment can reduce the number of comparators which are required to approximately ½ that required in the ninth embodiment.

Figure 14:
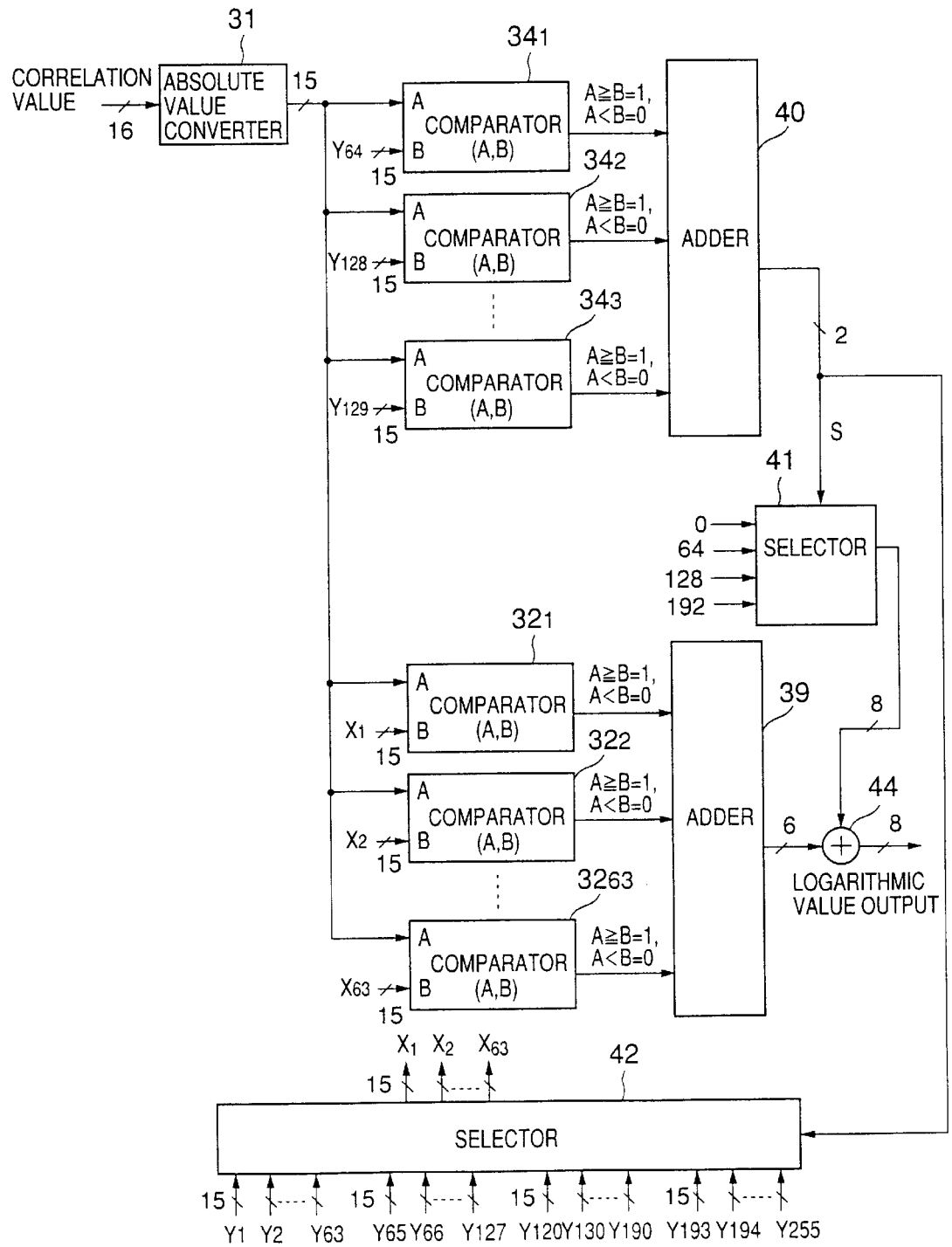
FIG. 14 is a system block diagram showing a modification of the tenth embodiment of the searcher.

FIG. 14 shows a modification of the tenth embodiment. In FIG. 14, those parts which are the same as those corresponding parts in FIGS. 12 and 13 are designated by the same reference numerals, and a description thereof will be omitted.

This modification of the tenth embodiment is based on a concept similar to that of the tenth embodiment. In this modification, the correlation value (antilogarithm) output from the correlator 8 is divided into 4 and used to select the constants which are to be compared. As a result, it is possible to reduce the number of comparators which are required to approximately ¼ that required in the ninth embodiment described above.

More particularly, 3 comparators $34_1$ through $34_3$ are used to judge whether or not the correlation value belongs to one of the 4 divided ranges. Values of the constants $X_1$ through $X_{63}$ to be respectively input to the comparators $34_1$ through $34_3$ are switched depending on the result of this judgement. A logarithmic value to be added to an output value of an adder 39 is selected from 0, 64, 128 and 192 by a selector 41. In addition, the correlation value is detected by the comparators $32_1$ through $32_{63}$ in each of the 4 divided ranges, and outputs of the comparators $32_1$ through $32_{63}$ are added in the adder 39 to obtain a logarithmic value. A final logarithmic value in the range of 0 to 255 is obtained from an adder 44 by adding the logarithmic value 0, 64, 128 or 192 to the output logarithmic value of the adder 39.

Eleventh Embodiment

Figure 15:
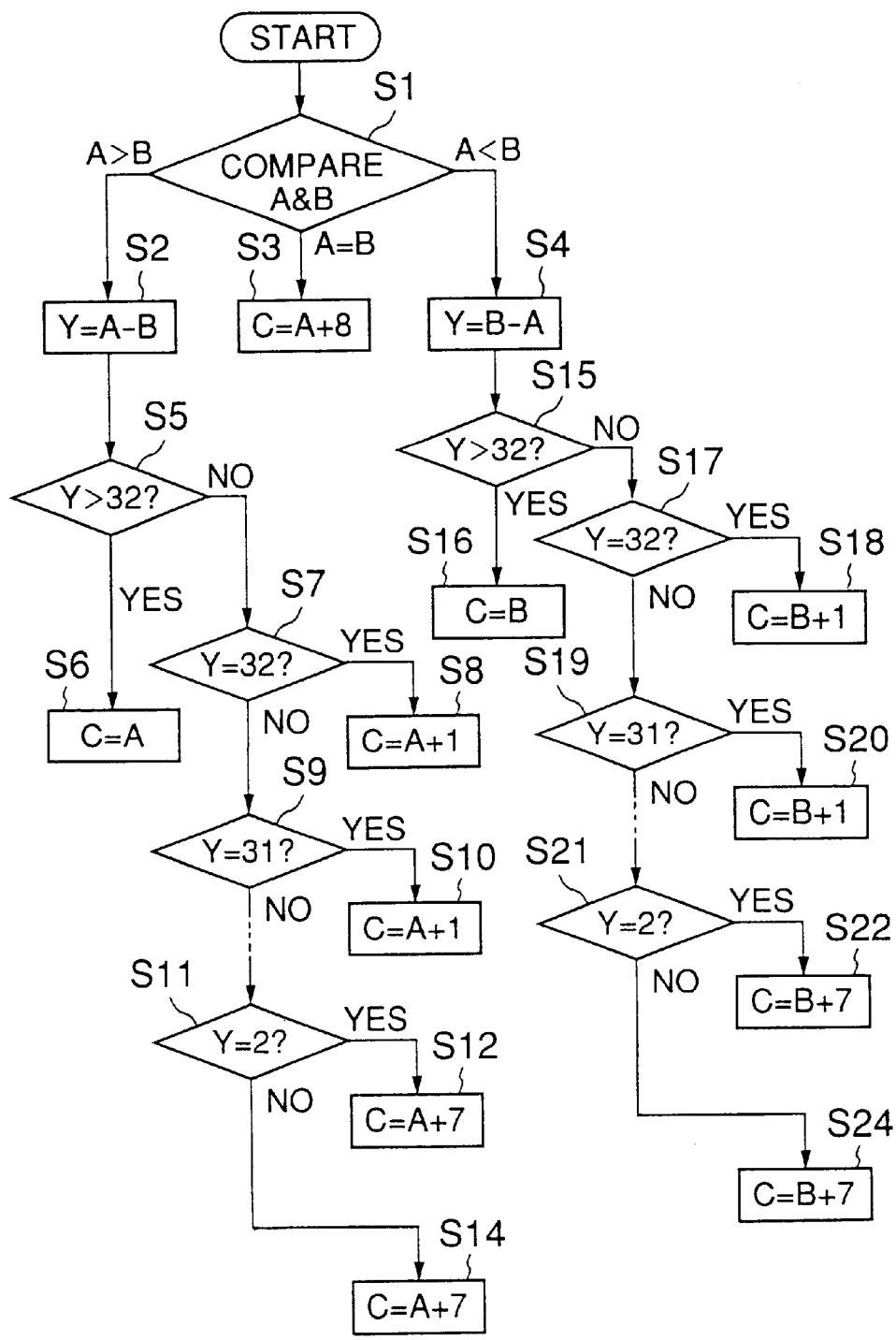
FIG. 15 is a flow chart for explaining a logarithmic addition process of an eleventh embodiment of the searcher according to the present invention.

Next, a description will be given of an eleventh embodiment of the searcher according to the present invention, by referring to FIGS. 15 and 16. FIG. 15 is a flow chart for explaining a logarithmic addition process of this eleventh embodiment of the searcher. FIG. 16 is a diagram showing a table for explaining the logarithmic addition process of this eleventh embodiment of the searcher.

According to the eighth embodiment described above which uses the memory table to carry out the logarithmic addition, there is a limit to greatly reducing the scale of the circuit or greatly increasing the operation speed of the circuit. In this eleventh embodiment, the logarithmic addition is carried out according to an algorithm shown in FIG. 15.

For example, when the logarithmic value is obtained by a logarithmic conversion using 0.4 dB/step for a resolving power of 0.4 dB, and a value A (dB) and a value B (dB) are added, the added result becomes substantially the same as the larger one of the values A and B if a difference between the values A and B is greater than 12.8 dB. Accordingly, it is sufficient to calculate a difference $\Delta$ between the values A and B only when the difference $\Delta$ is smaller than 12.8 dB (32), and to add to the larger one of the values A and B a constant $\delta$ which is determined depending on the error $\Delta$.

FIG. 16 shows the above described relationship in the form of a table. As may be seen from FIG. 16, the value of A+B (dB) can be obtained by adding the predetermined constant $\delta$ to the larger one of the values A and B depending on the magnitude of the error $\Delta$ (dB) between the value A (dB) and the value B (dB). In FIG. 16, each value within the brackets "( )" indicates a value used by hardware, where 1 step is equal to 0.4 dB.

In the logarithmic addition algorithm shown in FIG. 15, a step S1 compares the magnitudes of the values A and B, and a step S2 obtains a difference Y (=$\Delta$dB) between the values A and B from Y=A−B if A>B. A step S5 decides whether or not Y>32, and a step S6 sets the larger value A as a logarithmic value C (=A+B) of the added result if the decision result in the step S5 is YES. On the other hand, if the decision result in the step S5 is NO, steps S7 through S12 and S14 are carried out to set a sum of the larger value A and the predetermined constant δ as the logarithmic value C of the added result.

If A=B in the step S1, a step S3 sets a sum of 8 and the value A or B as the logarithmic value C of the added result.

Furthermore, if A<B in the step S1, steps S4 obtains a difference Y (=Δ dB) between the values A and B from Y=B−A. A step S15 decides whether or not Y>32, and a step S16 sets the larger value B as the logarithmic value C (=A+B) of the added result if the decision result in the step S15 is YES. On the other hand, if the decision result in the step S15 is NO, steps S17 through S22 and S24 are carried out to set a sum of the larger value B and the predetermined constant δ as the logarithmic value C of the added result.

For the sake of convenience, in FIG. 15, similar steps between the steps S9 and S11 are omitted, and similar steps between the steps S19 and S21 are omitted.

Twelfth Embodiment

Figure 17:
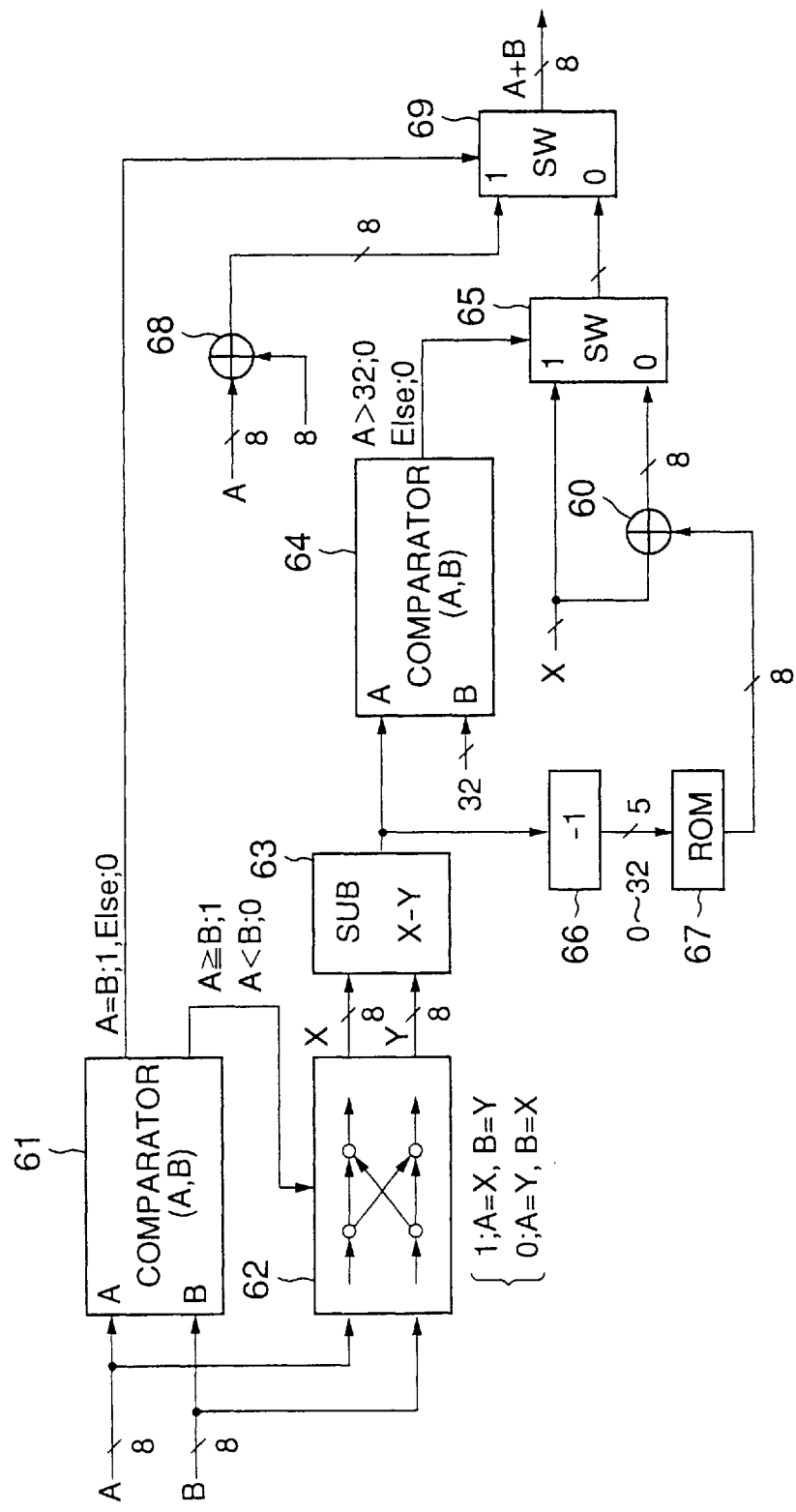
FIG. 17 is a system block diagram showing a twelfth embodiment of the searcher according to the present invention.
Figure 18:
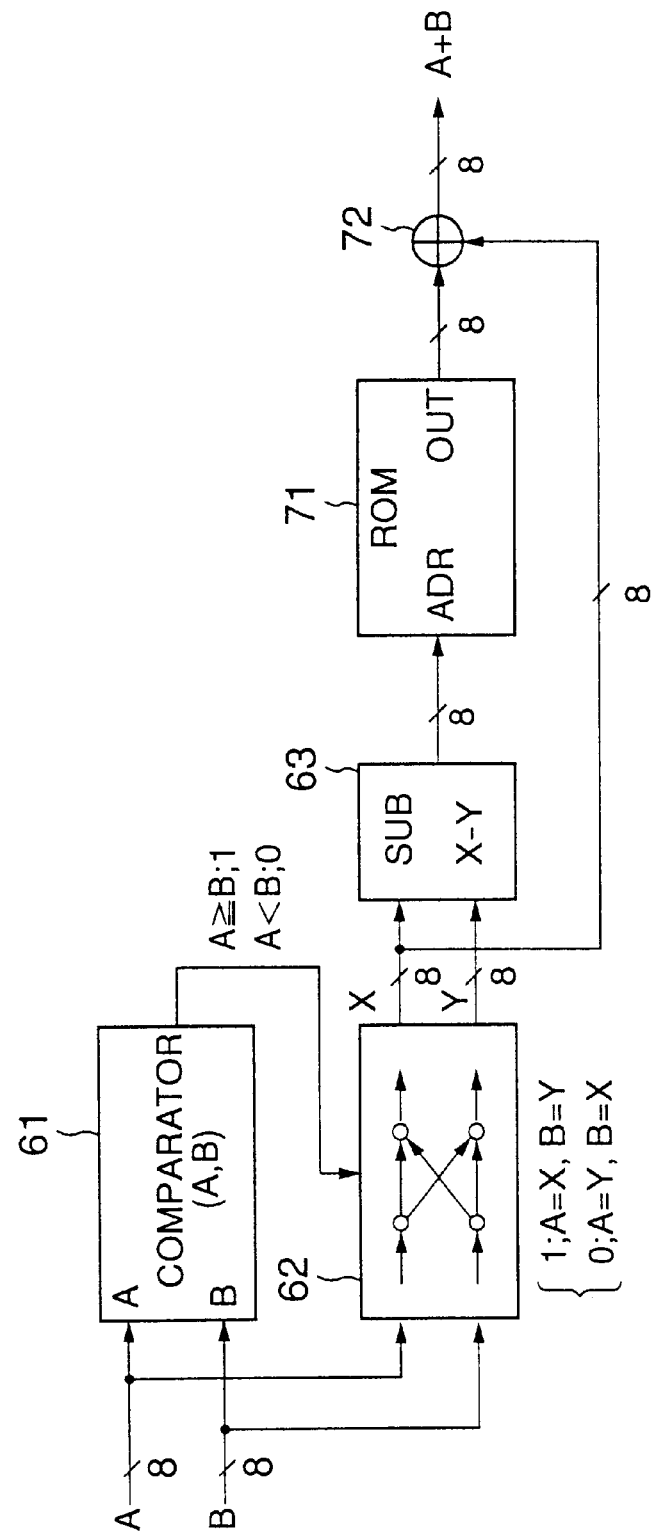
FIG. 18 is a system block diagram showing a modification of the twelfth embodiment of the searcher.

FIG. 17 is a system block diagram showing a twelfth embodiment of the searcher according to the present invention. In addition, FIG. 18 is a system block diagram showing a modification of the twelfth embodiment of the searcher. In FIG. 18, those parts which are the same as those corresponding parts in FIG. 17 are designated by the same reference numerals, and a description thereof will be omitted.

In this twelfth embodiment and the modification thereof, the circuit part for carrying out the logarithmic addition used in the searcher is formed by a logic circuit as shown in FIGS. 17 and 18. The circuits shown in FIGS. 17 and 18 basically have similar constructions, and realize the algorithm described above in conjunction with FIG. 15 by hardware. Although the circuit construction shown in FIG. 17 is slightly more complex compared to that of FIG. 18, the required memory capacity (256 bits) is smaller than that required in FIG. 18. On the other hand, although the circuit construction shown in FIG. 18 is slightly less complex compared to that of FIG. 17, the required memory capacity (2048) is slightly larger than that required in FIG. 17. In either case, the scale of the circuits shown in FIGS. 17 and 18 is small.

More particularly, in a logarithmic adder circuit shown in FIG. 17, the magnitude comparison of the step S1 shown in FIG. 15 is carried out by a comparator 61, and an output of a switch part 62 is switched depending on a comparison result output from the comparator 61, so that A=X and B=Y if A>B, and A=Y and B=X if A<B. In other words, the switch part 62 carries out a process corresponding to the steps S5 through S14 and the steps S15 through S24 shown in FIG. 15. A subtractor 63 obtains a difference between the values A and B, so as to carry out a process corresponding to the steps S5 and S4 shown in FIG. 15.

Switches 65 and 69 are switched so as to output the larger one (=X) of the values A and B as an added result (A+B) dB. If this difference is less than or equal to 32, the constant δ is read from a ROM 67 depending on the value (0 through 31) of this difference. A decrementing part 66 decrements the difference output from the subtractor 63 by 1. An adder 60 adds this constant δ and the larger one (=X) of the values A and B, and the switches 65 and 69 are switched so as to output the larger one (=X) of the values A and B as the added result (A+B) dB.

On the other hand, if A=B, an adder 68 adds a value 8 to the value A, and the switch 69 is controlled so as to output the sum of the value 8 and the value A as the added result (A+B) dB.

In the logarithmic adder circuit shown in FIG. 18, a circuit part for carrying out the process of the subtractor 63 and the subsequent circuit part is replaced by a ROM table 71 and an adder 72.

Therefore, according to the searcher of the present invention, it is possible to reduce the number of bits without sacrificing the dynamic range, and the scale and power consumption of the circuit can be reduced, while the operation speed of the circuit can be improved.

Further, the present invention is not limited to these embodiments, but various variations and modifications may be made without departing from the scope of the present invention.

What is claimed is:

1. A searcher for a CDMA receiver apparatus, comprising:
   a correlator obtaining a correlation value between a spreading code sequence and a spreading code sequence within a received signal; and
   a non-linear processor carrying out a non-linear conversion to convert one of the correlation value and a predetermined value indicative of the correlation value into correlation value information which has a data width smaller than that of said one of the correlation value and the predetermined value,
   said correlation value information being used to carry out a search process to search for a synchronizing timing with respect to the spreading code sequence within the received signal.

2. The searcher as claimed in claim 1, wherein said non-linear processor carries out the non-linear conversion with respect to the correlation value.

3. The searcher as claimed in claim 1, wherein said non-linear processor converts the predetermined value into a power value which is output as the correlation value information.

4. The searcher as claimed in claim 1, which further comprises:
   a power value converter converting the correlation value into a power value,
   said power value being supplied to said non-linear processor as the predetermined value.

5. The searcher as claimed in claim 1, wherein said non-linear conversion includes a logarithmic conversion of the predetermined value into the correlation value information having the data width smaller than that of the predetermined value.

6. The searcher as claimed in claim 4, wherein said non-linear conversion includes a common logarithmic conversion of the power value into the correlation value information, and said power value converter carries out a square operation on an antilogarithm by making a bit-shift operation with respect to a logarithmic value.

7. The searcher as claimed in claim 1, wherein said correlator includes a matching filter which corresponds to a plurality of symbols and outputs the correlation value by composing one of amplitudes and absolute values of correlation values corresponding to the plurality of symbols.

8. The searcher as claimed in claim 1, wherein:
   the received signal has a signal format in which pilot signals of a plurality of symbols which are known data are periodically inserted within information data,
   said correlator includes a matching filter which corresponds to the plurality of symbols and outputs the correlation value by composing one of amplitudes and absolute values of correlation values corresponding to the plurality of symbols, said correlator adds antilogarithms with respect to adjacent pilot signals within the received signal when composing one of the amplitudes and absolute values of the correlation values corresponding to the plurality of symbols, and said searcher further comprises:
a power value converter carrying out a square operation with respect to the correlation value output from said correlator so as to convert blocks of pilot signals having the information data interposed therebetween into power values; and
a logarithmic adder carrying out a cyclic integration by adding logarithmic values of the power values.

9. The searcher as claimed in claim 1, wherein:
said CDMA receiver apparatus has an automatic gain control function with respect to the received signal,
and said searcher further comprises:
a cyclic integration circuit carrying out a cyclic integration with respect to the correlation value information in order to improve a signal-to-noise ratio when carrying out the search process to search for the synchronizing timing with respect to the spreading code sequence within the received signal,
a cancel circuit carrying out a logarithmic addition and subtraction with respect to the correlation value information using a gain of the automatic gain control function, so that effects of the automatic gain control function with respect to the correlation value information are cancelled.

10. The searcher as claimed in claim 1, wherein said non-linear processor carries out the non-linear conversion using a memory table.

11. The searcher as claimed in claim 3, wherein said non-linear processor carries out one of the non-linear conversion and the conversion of the predetermined value into the power value using a memory table.

12. The searcher as claimed in claim 4, wherein said power value converter converts the correlation value into the power value using a memory table.

13. The searcher as claimed in claim 1, wherein said non-linear processor comprises:
a plurality of comparators respectively comparing the received signal and threshold values which are divided into stages with a step width of a logarithmic value; and
an adder adding outputs of the comparators.

14. The searcher as claimed in claim 13, wherein said non-linear processor further comprises:
judging means for dividing the received signal into N ranges based on an antilogarithm, and judging one of the N ranges in which the received signal belongs;
switching means for switching the threshold values input to the comparators depending on a judgement result of said judging means; and
adding means for adding a predetermined logarithmic value to an output of said adder depending on the judgement result of said judging means.

15. The searcher as claimed in claim 1, which further comprises:
a cyclic integration circuit carrying out a cyclic integration with respect to the correlation value information using a logarithmic addition which obtains a difference between two logarithmic values which are to be added and obtains an added result by adding a value dependent on the difference to a larger one of the two logarithmic values.

16. A searcher for a CDMA receiver apparatus, comprising:
a correlator obtaining a correlation value between a spreading code sequence and a spreading code sequence within a received signal;
a non-linear processor carrying out a non-linear conversion to convert the correlation value into a value which has a data width smaller than that of the correlation value; and
a power value converter converting the value obtained from said non-linear processor into a power value and outputting the power value as correlation value information,
said correlation value information being used to carry out a search process to search for a synchronizing timing with respect to the spreading code sequence within the received signal.

17. The searcher as claimed in claim 16, wherein said non-linear conversion includes a logarithmic conversion of the correlation value into the value having the data width smaller than that of the correlation value.

18. The searcher as claimed in claim 16, wherein said correlator includes a matching filter which corresponds to a plurality of symbols and outputs the correlation value by composing one of amplitudes and absolute values of correlation values corresponding to the plurality of symbols.

19. The searcher as claimed in claim 16, wherein:
the received signal has a signal format in which pilot signals of a plurality of symbols which are known data are periodically inserted within information data,
said correlator includes a matching filter which corresponds to the plurality of symbols and outputs the correlation value by composing one of amplitudes and absolute values of correlation values corresponding to the plurality of symbols,
said correlator adds antilogarithms with respect to adjacent pilot signals within the received signal when composing one of the amplitudes and absolute values of the correlation values corresponding to the plurality of symbols,
and said searcher further comprises:
a power value converter carrying out a square operation with respect to the correlation value output from said correlator so as to convert blocks of pilot signals having the information data interposed therebetween into power values; and
a logarithmic adder carrying out a cyclic integration by adding logarithmic values of the power values.

20. The searcher as claimed in claim 16, wherein:
said CDMA receiver apparatus has an automatic gain control function with respect to the received signal,
and said searcher further comprises:
a cyclic integration circuit carrying out a cyclic integration with respect to the correlation value information in order to improve a signal-to-noise ratio when carrying out the search process to search for the synchronizing timing with respect to the spreading code sequence within the received signal,
a cancel circuit carrying out a logarithmic addition and subtraction with respect to the correlation value information using a gain of the automatic gain control function, so that effects of the automatic gain control function with respect to the correlation value information are cancelled.

21. The searcher as claimed in claim 16, wherein said non-linear processor carries out the non-linear conversion using a memory table.

22. The searcher as claimed in claim 16, wherein said non-linear processor comprises:
- a plurality of comparators respectively comparing the received signal and threshold values which are divided into stages with a step width of a logarithmic value; and
- an adder adding outputs of the comparators.

23. The searcher as claimed in claim 22, wherein said non-linear processor further comprises:
- judging means for dividing the received signal into N ranges based on an antilogarithm, and judging one of the N ranges in which the received signal belongs;
- switching means for switching the threshold values input to the comparators depending on a judgement result of said judging means; and
- adding means for adding a predetermined logarithmic value to an output of said adder depending on the judgement result of said judging means.

24. The searcher as claimed in claim 16, which further comprises:
- a cyclic integration circuit carrying out a cyclic integration with respect to the correlation value information using a logarithmic addition which obtains a difference between two logarithmic values which are to be added and obtains an added result by adding a value dependent on the difference to a larger one of the two logarithmic values.

25. A CDMA receiver apparatus comprising:
- a generator generating a spreading code, and
- a searcher controlling a generation timing of the generator, said searcher comprising:
- a correlator obtaining a correlation value between said spreading code sequence and a spreading code sequence within a received signal; and
- a non-linear processor carrying out a non-linear conversion to convert one of the correlation value and a predetermined value indicative of the correlation value into correlation value information which has a data width smaller than that of said one of the correlation value and the predetermined value, said correlation value information being used to carry out a search process to search for a synchronizing timing with respect to the spreading code sequence within the received signal.

* * * * *